Sept. 16, 1941.　　　B. G. CALL　　　2,255,758
TRANSPORT TRUCK
Filed Feb. 15, 1940　　　2 Sheets-Sheet 1
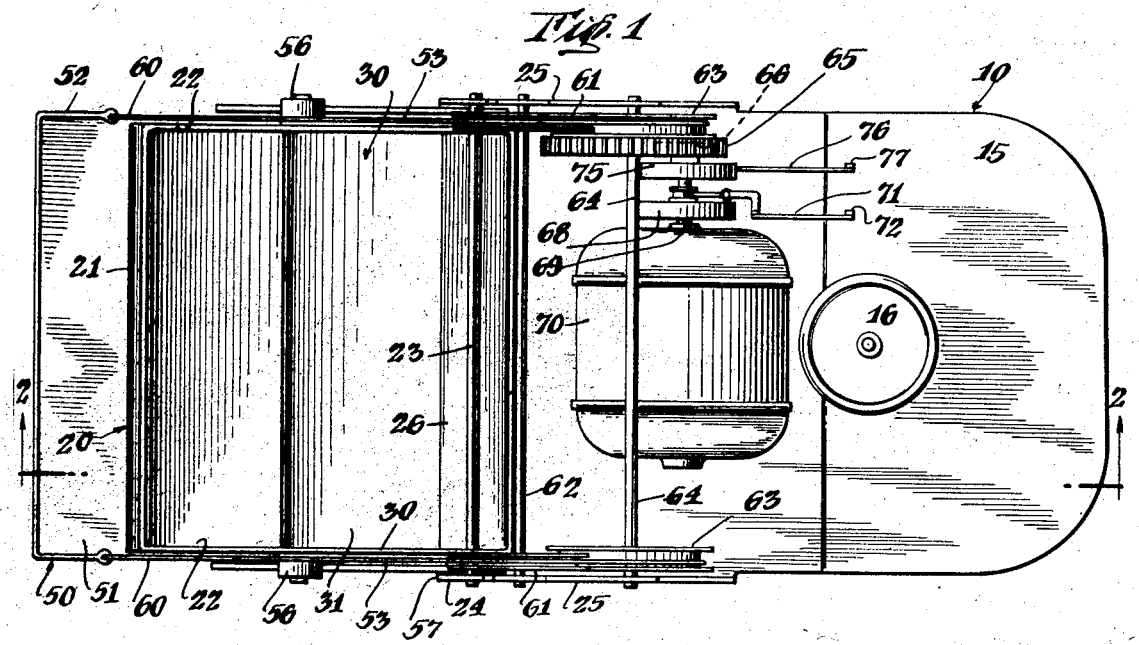
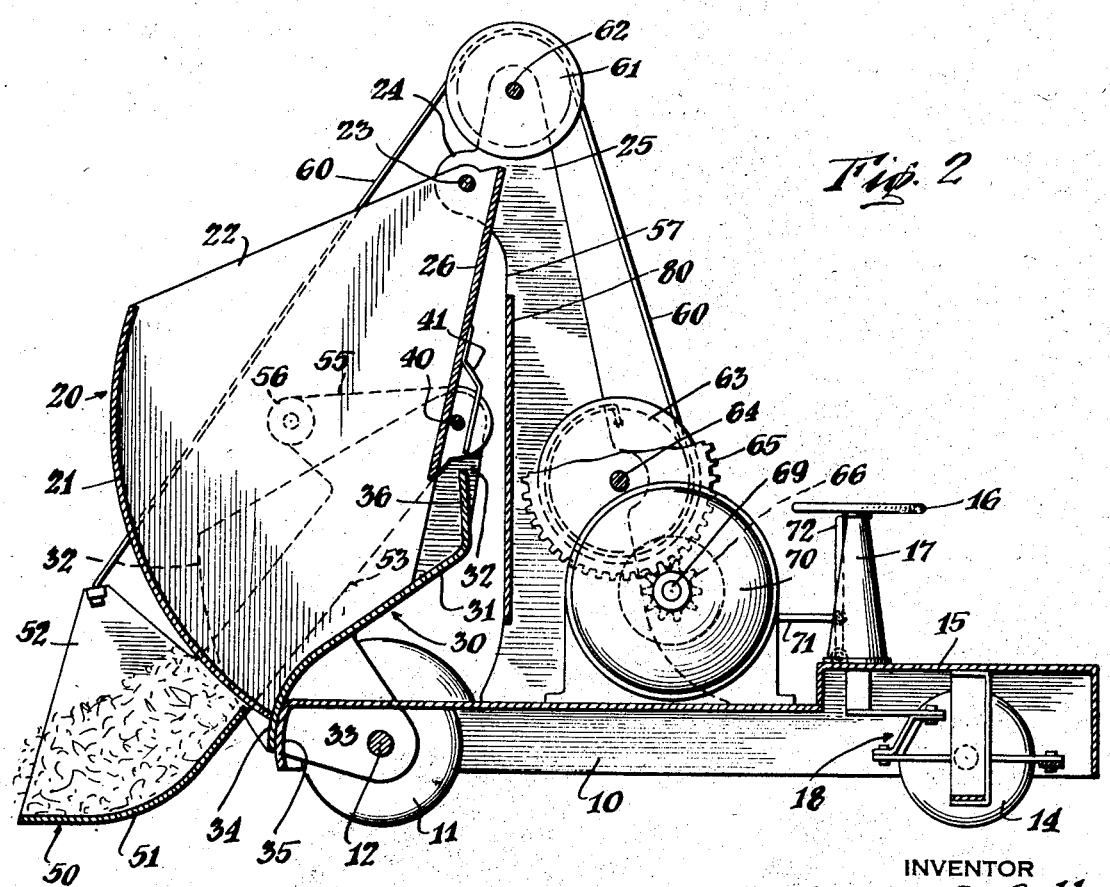
INVENTOR
Benjamin G. Call
BY
James K. Kent
ATTORNEY

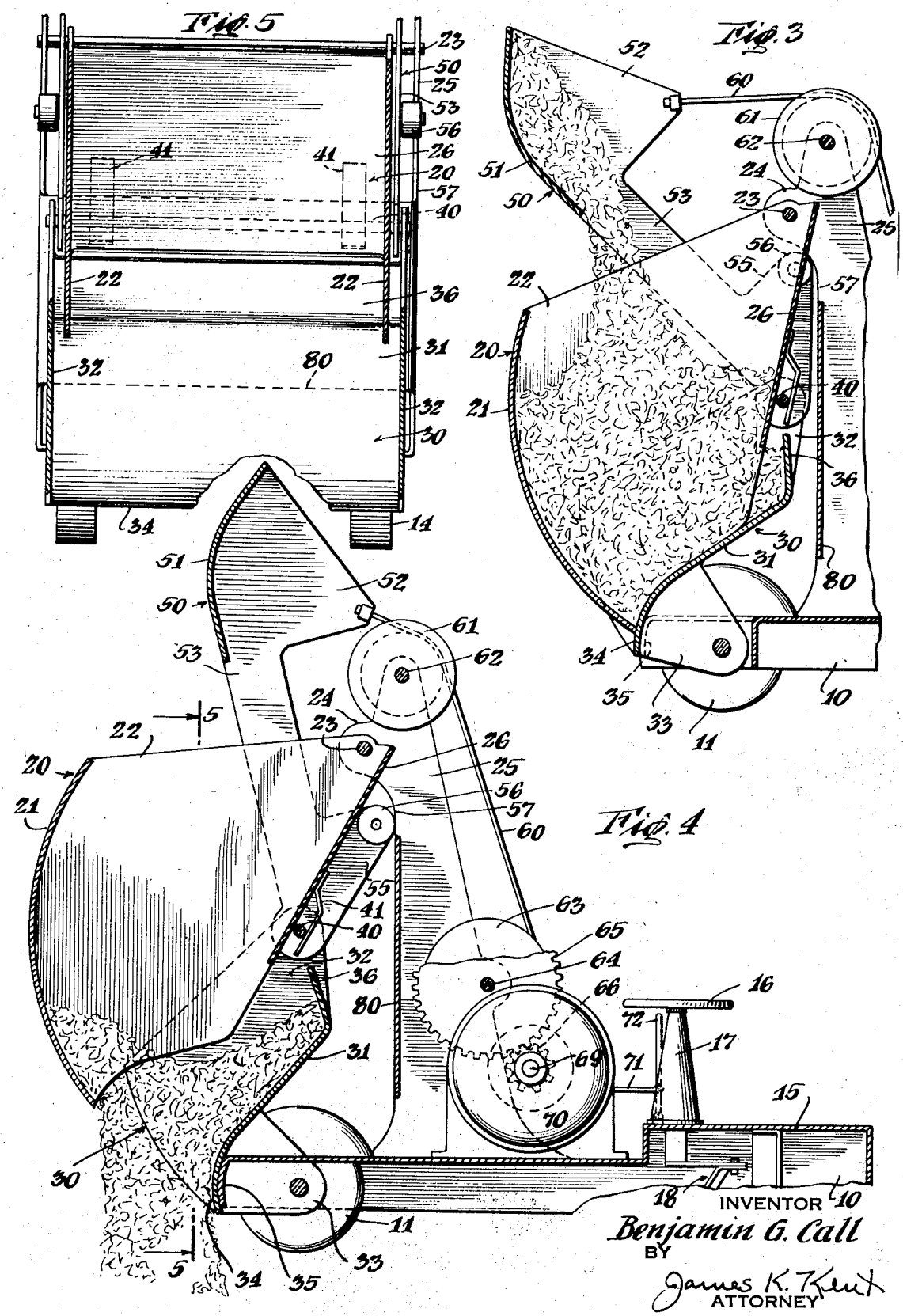

Patented Sept. 16, 1941

2,255,758

UNITED STATES PATENT OFFICE 2,255,758

TRANSPORT TRUCK

Benjamin G. Call, Tacoma, Wash., assignor to American Smelting and Refining Company, New York, N. Y., a corporation of New Jersey Application February 15, 1940, Serial No. 318,991

14 Claims. (Cl. 214—78)

This invention relates to transport trucks and more particularly to a truck of the self-loading and self-dumping type.

An object of the invention is to provide a novel and improved transport truck of the type above specified.

Another object is to provide a transport truck for use in smelters or the like which is capable of picking up, transporting and dumping loose material such as ore, fuel, flue dust, baghouse dust and the like.

Another object is to provide a transport truck of the above type having a compact hopper and shovel arrangement.

Another object is to provide a truck of the above type which is so constructed and arranged that the material being handled does not contact or spill over onto the driving or hoisting mechanism.

Another object is to provide a device of the above type in which the various parts are readily accessible for repair and maintenance purposes.

Another object is to provide a device of the above type which can be readily handled by a single operator.

Various other objects and advantages will be apparent as the nature of the invention is more fully disclosed.

Although the novel features which are believed to be characteristic of this invention are more particularly pointed out in the claims appended hereto, the nature of the invention will be better understood by referring to the following description, taken in connection with the accompanying drawings, in which a specific embodiment thereof has been set forth for purposes of illustration.

In the drawings:

Fig. 1 is a top plan view of a transport truck embodying the present invention;

Fig. 2 is a vertical longitudinal section taken on the line 2—2 of Fig. 1 showing the shovel in position for picking up material;

Fig. 3 is a partial section similar to Fig. 2 showing the shovel in position for feeding material into the hopper;

Fig. 4 is a section similar to Fig. 2 showing the shovel and hopper in dumping position; and Fig. 5 is a vertical transverse section taken along the line 5—5 of Fig. 4.

In the embodiment shown in the drawings, the truck is shown as comprising a carriage 10 mounted upon front wheels 11 which are journalled about an axle 12 carried by said carriage, and upon rear wheels 14 which are mounted by suitable means (not shown) for pivotal movement for steering purposes. The carriage 10 is shown as provided with a platform 15 on which the operator may stand. A steering wheel 16 is mounted on a pedestal 17 extending from the platform 15 and actuates suitable linkage mechanism, indicated at 18, by which the rear wheels 14 are turned for steering. Inasmuch as the steering mechanism may be embodied in any well known form, the details thereof have not been set forth herein. It is to be understood that a suitable propelling means, such as a motor is incorporated in the carriage and connected by suitable transmission means to the front wheels 11, or to the rear wheels 14, if desired, for supplying power for propulsion. Inasmuch as the propulsion mechanism may take any standard form and does not constitute a part of the present invention, it has been omitted from the drawings for clearness.

In accordance with the present invention, the truck is provided with a hopper comprising a pair of separable sections 20 and 30. The section 20 comprises an arcuate wall 21 forming the front of the hopper and a pair of side walls 22 which are pivotally mounted on a rod 23 held in ears 24 formed on a standard 25 carried by the carriage 10. A plate 26, forming the back wall of the section 20, is mounted between the side walls 22.

The section 30 comprises a wall 31 adapted to form a portion of the back and bottom of the hopper, and a pair of side walls 32. The section 30 is pivotally mounted on the axle 12 by means of ears 33 which may be secured thereto or may form a part of the side walls 32. The forward end 34 of the wall 31 is curved about the axle 12 as a radius and is adapted to slide over a similarly curved flange 35 on the carriage 10. The rear end of the wall 31 is bent upwardly to provide a back flange 36 which, in conjunction with the plate 26, forms a rear closure for the hopper. A rod 40 extends between the side walls 32 of the section 30 in a position to rest against the back of the plate 26 when the hopper is in closed position, as shown in Fig. 2.

The plate 26 is shown as provided with a set of clips 41 which are spaced from the plate 26 to form a channel in which the rod 40 is seated. The plate 26 and the clips 41 are adapted to actuate the rod 40 so as to control the pivotal movement of the section 30 about the axle 12 as will be described. The wall 21 of the section 20 is curved about the rod 40 as a center and the bottom edge of the wall 21 is adapted to rest upon the forward end 34 of the wall 31. The flange 35 is adapted to support the weight of the section 20 when in this position.

The truck is provided with a shovel 50 having a bottom wall 51 and a pair of side walls 52. The shovel is mounted upon a pair of arms 53 which extend between the side walls 32 and the side walls 22 and are pivoted about the rod 40. The forward end of the wall 51 is adapted to rest upon the floor when the shovel 50 is in its lower position, as shown in Fig. 2, for scooping up and receiving the material which is to be transported. The rearward end of the wall 51 extends closely adjacent the wall 21 of the section 20 which forms a back for the shovel to prevent the material from falling out when the shovel is lifted by pivotal movement of the arms 53 about the rod 40.

The arms 53 are provided with ears 55 carrying rollers 56. The rollers 56 are positioned to bear against the forward edge 57 of the standard 25 when the shovel 50 is elevated as shown in Fig. 4. The shovel 50 is actuated by cables 60 extending over sheaves 61 which are mounted on a rod 62 carried in the standards 25 and are attached to winding drums 63 mounted upon a shaft 64 which is journalled in the standards 25.

Suitable operating means is provided for the shaft 64. In the embodiment shown this comprises a gear wheel 65 carried by the shaft 64 and actuated by a pinion 66 carried upon a shaft 64 and adapted to be connected by a clutch 68 to the shaft 69 of a motor 70. The clutch 68 may be operated by a suitable control linkage 71 connected to a hand lever 72 which is located in a position accessible to the operator of the truck. The shaft 64 may also carry suitable brake means, such as a brake drum 75 controlled by a linkage 76 actuated by a handle 77 accessible to the operator.

It is to be understood, of course, that the motor 70 and the power connections for operating the shovel 50 may be of any desired type and that a specific embodiment has been shown merely for purposes of illustration. The motor 70 may also be connected by suitable drive means, not shown, to the wheels for propelling the vehicle or the vehicle may be propelled by a separate motor as above mentioned.

A plate 80 may be mounted on the standards 25 in a position to shield the hoisting mechanism and the motor 70 and to prevent dust or the like from passing through the opening between the plate 26 and the wall 31 onto said mechanism.

In the operation of the above described mechanism for picking up and transporting material, the shovel 50 is brought into pick-up position, as shown in Fig. 2, with the wall 51 thereof resting upon or adjacent to the floor. In this position the front wall 21 of the section 20 of the hopper rests upon the front portion 34 of the wall 31 of the section 30 and is supported thereby and by the flange 35 of the carriage 10, thereby closing the bottom of the hopper. The weight of the section 20 serves to hold the hopper in closed position.

The truck is now manipulated so as to cause the shovel 50 to enter the pile of material to be picked up. When the shovel has been filled, it is elevated by actuation of the lever 72 which connects the hoist to the motor 70 and causes the cables 60 to be reeled up on the drums 63, thereby lifting the shovel into the position shown in Fig. 3. During this movement the arms 53 of the shovel pivot about the rod 40 and the shovel moves upwardly about the arcuate front 21 of the section 20 of the hopper.

The upward movement of the shovel is stopped at the point where the rollers 56 contact with the surface 57 of the standards 25. The material then falls out of the shovel into the hopper and is accumulated therein. The shovel may be held in raised position by actuation of the lever 77 which controls the brake drum 75 and may be lowered when desired for repeating the above mentioned operation by releasing the brake drum.

When the hopper has been filled, the truck may be moved as desired to the point at which the material is to be dumped. The dumping operation is effected in the same manner as the filling operation. For dumping the hopper, the shovel is again raised. However, instead of stopping the shovel at the point above specified, the shovel is raised to the full extent of its permissible movement as shown in Fig. 4. After the shovel reaches the position of Fig. 3 with the rollers 56 engaging the surfaces 57 of the standards 25, further movement of the shovel causes the arms 53 to pivot about the rollers 56, thereby shifting the rod 40 outwardly. This shifting of the rod 40 causes the front section 20 of the hopper to pivot about the rod 23, thereby raising the front wall 21 thereof for releasing the charge, and at the same time causes the section 30 to pivot about the axle 12, thereby tipping up the wall 31 into a position such that the material slides over this wall and is discharged. It will be noted that the two sections are thus separated and tilted in such a way that the material is rapidly and completely discharged from the hopper.

After the material has been dumped, as above described, the hopper is again closed by the simple operation of lowering the shovel, which first retracts the sections 20 and 30 of the hopper to the position shown in Fig. 3 and then lowers the shovel into pick-up position, as shown in Fig. 2.

In the above described operation the rear walls 26 and 36 of the hopper form a closure which shields the hoisting apparatus from the material being handled by the shovel. The plate 80 forms an additional shield to prevent dust or the like from passing between the walls 26 and 36 onto the hoisting mechanism.

It will be noted that the above described device is simple and convenient in operation and may be readily handled by the workman inasmuch as the same set of controls are used both for loading and dumping purposes. Furthermore, the truck may be made in practically any desired size according to the particular use to be made of it. It is well suited for use within plants where the head room is comparatively low. It will be understood, of course, that the specific construction shown is for the purpose of illustration and that various changes may be made within the scope of the invention as defined in the following claims.

What is claimed is:

1. A self-loading and self-dumping truck for transporting material comprising a hopper formed in sections adapted to be separated for dumping said material, a shovel, means mounting said shovel for movement from a material pick-up position to a position to feed said material into said hopper, and means actuated in response to a predetermined additional upward movement of said shovel for separating said hopper sections.

2. A self-loading and self-dumping truck for transporting material comprising a hopper formed in sections adapted to be separated for dumping said material, a shovel, a pair of arms carrying said shovel, means pivotally mounting said arms for movement from a material pick-up position to a position to feed said material into said hopper, and means actuated in response to a predetermined additional upward movement of said shovel for separating said hopper sections.

3. A self-loading and self-dumping truck for transporting material comprising a hopper formed in sections adapted to be separated for dumping said material, a shovel, a pair of arms carrying said shovel, means pivotally mounting said arms for movement from a material pick-up position to a position to feed said material into said hopper, means actuated in response to a predetermined additional upward movement of said shovel for separating said hopper sections, and a hoist including a flexible cable connected to actuate said shovel.

4. A self-loading and self-dumping truck for transporting material comprising: a carriage, a hopper formed in sections adapted to be separated for dumping said material, means mounting said sections on said carriage for pivotal movement into closed or separated positions, a shovel, means pivotally mounting said shovel on one of said sections for movement from a material pick-up position to a position to feed said material into said hopper, and means actuated in response to a predetermined additional upward movement of said shovel for separating said hopper sections.

5. A self-loading and self-dumping truck for transporting material comprising: a carriage, a hopper formed in sections adapted to be separated for dumping said material, means mounting said sections on said carriage for pivotal movement into closed or separated positions, a shovel, a pair of arms carrying said shovel, means pivotally mounting said arms on one of said sections, means to elevate said shovel from a material pick-up position to a position to feed said material into said hopper, and means carried by said arms to engage said carriage in response to a predetermined additional movement thereof, said last means being adapted to cause pivotal movement of said sections to dumping position.

6. A self-loading and self-dumping truck for transporting material comprising: a carriage having an upstanding standard, a hopper formed in a pair of sections adapted to be separated for dumping said material, means pivotally mounting one of said sections on said carriage, means pivotally mounting the other of said sections on said standard, means interconnecting said sections so constructed and arranged that said sections are pivotally moved in unison to dumping position, a shovel, and means actuated by said shovel to cause said pivotal movement of said sections into dumping position.

7. A self-loading and self-dumping truck for transporting material comprising: a carriage having an upstanding standard, a hopper formed in a pair of sections adapted to be separated for dumping said material, means pivotally mounting one of said sections on said carriage, means pivotally mounting the other of said sections on said standard, means interconnecting said sections so constructed and arranged that said sections are pivotally moved in unison to dumping position, a shovel, a pair of arms pivoted to said first section carrying said shovel, and means carried by said arms to engage said standard for causing said pivotal movement of said sections into dumping position.

8. A self-loading and self-dumping truck for transporting material comprising: a carriage having an upstanding standard, a hopper formed in a pair of sections adapted to be separated for dumping said material, means pivotally mounting one of said sections on said carriage, means pivotally mounting the other of said sections on said standard, means interconnecting said sections so constructed and arranged that said sections are pivotally moved in unison to dumping position, a shovel, a pair of pivoted arms carrying said shovel, a hoist connected to lift said shovel from a material pick-up position to a position to feed said material into said hopper, and means carried by said arms to cause said pivotal movement of said sections into dumping position in response to a predetermined further movement of said shovel from the feed position.

9. A self-loading and self-dumping truck for transporting material comprising: a carriage having an upstanding standard, a hopper formed in a pair of sections adapted to be separated for dumping said material, means pivotally mounting one of said sections on said carriage, means pivotally mounting the other of said sections on said standard, means interconnecting said sections so constructed and arranged that said sections are pivotally moved in unison to dumping position, a shovel, a pair of pivoted arms carrying said shovel, a hoist connected to lift said shovel from a material pick-up position to a position to feed said material into said hopper, and means carried by said arms adapted to cooperate with said standard to cause said pivotal movement of said sections into dumping position in response to a predetermined further movement of said shovel from the feed position.

10. A self-loading and self-dumping truck for transporting material comprising a carriage, a hopper formed in sections adapted to be separated for dumping said material, means pivotally mounting said sections on said carriage for movement in unison to dumping position, said hopper having an arcuate front wall, a shovel having an open discharge end, means pivotally mounting said shovel for movement over said arcuate wall from a material pick-up position to a position to feed said material into said hopper with the discharge end of said shovel in proximity to said arcuate wall during said movement, whereby said arcuate wall forms a support to hold the material in said shovel during the movement thereof to feed position.

11. A self-loading and self-dumping truck for transporting material comprising a carriage, a hopper formed in sections adapted to be separated for dumping said material, means pivotally mounting said sections on said carriage for movement in unison to dumping position, said hopper having an arcuate front wall, a shovel having an open discharge end, means pivotally mounting said shovel for movement over said arcuate wall from a material pick-up position to a position to feed said material into said hopper with the discharge end in proximity to said arcuate wall during said movement, whereby said arcuate wall forms a support to hold the material in said shovel during the movement thereof to feed position and means actuated by a predetermined further movement of said shovel beyond said feed position to cause pivotal movement of said sections into dumping position.

12. A self-dumping truck for transporting material comprising a carriage, a hopper formed in a pair of sections adapted to be separated for dumping said material, one of said sections having a wall forming the back and bottom of said hopper, the other of said sections having a wall forming the front of said hopper, means lifting said last wall and means actuated by said last means to tilt said first wall into dumping position, a shovel, means mounting said shovel for movement over said front wall into a position to feed said material into said hopper, and means actuated in response to a predetermined further movement of said shovel beyond said feed position to actuate said first means for dumping purposes.

13. A self-dumping truck for transporting material comprising a carriage, a hopper formed in a pair of sections adapted to be separated for dumping said material, one of said sections having a wall forming the back and bottom of said hopper, the other of said sections having a wall forming the front of said hopper, means lifting said last wall and means actuated by said last means to tilt said first wall into dumping position, a shovel, means mounting said shovel for movement over said front wall into a position to feed said material into said hopper, and means actuated in response to a predetermined further movement of said shovel beyond said feed position to actuate said first means for dumping purposes and a hoist connected to lift said shovel into feed position or dumping position.

14. A self-dumping truck for transporting material comprising a carriage, a hopper including a plurality of sections defining material supporting walls, means oppositely-disposed on the hopper sides pivotally mounting said sections for movement into closed or separated position and for retention by gravity in closed position, a shovel, means pivotally mounting said shovel for movement from pick-up position to feeding position over said hopper, and means actuated by a predetermined additional movement of said shovel beyond filling position for separating said sections.

BENJAMIN G. CALL.